(12) United States Patent
Gould

(10) Patent No.: US 6,207,447 B1
(45) Date of Patent: Mar. 27, 2001

(54) DAMPER AND BLOWER UNIT PROVIDING REVERSIBLE AERATION FOR COMPOSTING

(76) Inventor: Mark Gould, One Washburn Pl., Brookline, MA (US) 02446

( * ) Notice: Subject to any disclaimer, the term of this patent is extended or adjusted under 35 U.S.C. 154(b) by 0 days.

(21) Appl. No.: 09/349,338

(22) Filed: Jul. 8, 1999

(51) Int. Cl.[7] .................................................. C12M 1/00
(52) U.S. Cl. ...................................... 435/290.1; 454/338
(58) Field of Search .................................. 454/338, 178, 454/180, 181; 435/290.1

(56) References Cited

U.S. PATENT DOCUMENTS

| | | | |
|---|---|---|---|
| 1,695,784 | * 12/1928 | Sternberg | 454/338 |
| 1,695,804 | * 12/1928 | Feinberg | 454/338 X |
| 2,737,878 | * 3/1956 | Maho | 454/180 |

* cited by examiner

Primary Examiner—Harold Joyce

(57) ABSTRACT

A method or device is provided for connecting a centrifugal blower to a process requiring the flow of forced air such that the flow of air may be reversed. The method is applied to a process that benefits from the switching of the direction of air flow to either positive pressure or suction. The method was developed primarily use in the forced aeration composting process but may have other applications. The invention consists of a damper with a plurality of vanes rotating on parallel shafts, which is closely coupled to both the inlet and outlet of a centrifugal blower. When set to provide positive pressure, the vanes direct outside air to the blower intake and direct the blower discharge to the process requiring aeration. When set to provide suction, the vanes direct air from the process to the blower intake and direct the blower discharge to a port that may be connected to an air pollution control device. The shafts are connected by co-planar crank arms and linkages, such that the damper setting may be switched by a single actuator, thereby simplifying the automation of the reversal of air flow.

17 Claims, 4 Drawing Sheets

DAMPER AND BLOWER UNIT PROVIDING REVERSIBLE AERATION FOR COMPOSTING

BACKGROUND

The invention pertains to the forced air composting process in which the composting material is stacked in a pile or windrow over an air distribution system such as a plenum or perforated pipes connected to blowers. This process is widely used to convert sewage sludge into beneficial soil conditioner. Microorganisms generate heat as they respire and decompose the organic matter in the pile. Specified minimum temperatures are necessary to meet U.S. Environmental Protection Agency standards for reduction of pathogens, but excessive temperatures inhibit microbial activity resulting in incomplete decomposition of organic matter. Air is either blown upward through the pile, referred to herein as positive aeration, or drawn downward through the pile, referred to herein as negative aeration. The air supplies oxygen to the microorganisms, controls the process temperature by removing excess heat, and dries the compost. Positive and negative aeration each have advantages. Positive aeration is more efficient for and drying of the pile and for providing high temperatures near the surface of the pile. Negative aeration allows higher temperature in the core of the pile and allows capture of the exhaust for treatment. The most well-equipped composting plants provide both aeration modes, referred to as reversible aeration. Periodic reversal of aeration ensures that the temperature and moisture content are uniform throughout the depth of the pile and best ensure that all of the process objectives are met. The invention is a better method for providing reversible aeration capability.

Positive aeration is effected by drawing fresh air into the blower inlet and connecting the composting process air distribution system to the blower outlet. Negative aeration is effected by connecting the composting process air distribution system to the blower inlet. The blower outlet may be connected to an air pollution control device to treat the odorous exhaust gas before discharge.

The most widely used prior art is to connect ductwork to the inlet and outlet of the blower with four separate dampers, slide gates, or valves arranged such that the composting process air distribution system may be connected to either the outlet or the inlet of the blower. This design takes up excessive space and is costly. It cannot be easily automated, because four separate valves must be actuated for reversal of aeration mode.

U.S. Pat. No. 5,540,584 is for a plurality of valves linked mechanically, specifically for air flow reversal in regenerative thermal oxidizers. It is not applicable to the composting process.

A second alternative consists of a box assembly with four ports oriented at 90 degrees. Two opposing ports are connected to the blower inlet and outlet respectively. The other two ports are connected to the air distribution system and the air pollution control device respectively. An inserted plate or rotating damper blade in the assembly can provide positive aeration in one position and negative aeration by being rotated 90 degrees. U.S. Pat. No. 5,692,893 is for such a rotary valve. U.S. Pat. Nos. 3,897,800; 3,985,149; 3,773,066 and 4,842,016 are for valves of various configurations but similar function. None of the aforementioned patents are listed in classes pertaining to composting. With all of these devices, two additional valves are required to close or open the fresh air intake, so the number of valves to be actuated is reduced from four to three, and pressure drop is excessive.

A third alternative is to use manually connected flexible hoses between the blower, air distribution system, and air pollution control device. This alternative cannot be automated. A fourth alternative is to connect the flexible hoses from the blower inlet and outlets to a disk 180 degrees apart and the air distribution system and air pollution control device to a similar disk. The disks are in contact and on a common axis. Rotation of one disk relative to the other effects reversal of the aeration mode. U.S. Pat. No. 5,597,732 is for a small composting apparatus incorporating the rotating disks. It is practical only for small systems, with relatively small hose diameter.

U.S. Pat. No 3,967,779 is for an air mixing valve with a plurality of mechanically linked louvers mounted on parallel shafts inside a single assembly with multiple inlets. This valve does not pertain to air flow reversal.

BRIEF SUMMARY OF THE INVENTION

The invention consists of a housing coupled to the inlet and outlet of a centrifugal blower. The housing has three ports: one connected to the composting process air distribution system; one discharging polluted process exhaust, and one for the intake of fresh air. Inside the assembly are four or more vanes pivotally mounted on parallel shafts. The shafts are fitted with co-planar crank arms, which are connected by linkages, such that all of the shafts rotate through the same angular displacement when one is rotated. When the vanes are in the first of two alternate positions the negative aeration mode is effected by connecting the blower outlet to the air pollution control device, connecting the blower inlet to the composting process air distribution system, and blocking the fresh air intake.

When the vanes are in the second position the positive aeration mode is effected by blocking the discharge to the air pollution device, opening the fresh air intake, and directing the air from the outlet of the blower to the composting process air distribution system.

The reversal of the aeration mode is therefore effected by a single actuator, which makes automation of aeration reversal practical. The primary benefit is to public health, because automated reversal of aeration will increase the probability of reducing pathogens throughout the pile. The invention forms a compact rigid unit with the blower, making it easy to install and requires little space and little external ducting, as compared with the prior art. The invention has less pressure drop than the prior art, reducing blower horsepower and energy consumption.

BRIEF DESCRIPTION OF THE SEVERAL VIEWS OF THE INVENTION

FIG. 1 is an isometric drawing of the invention viewed from the air intake port, showing the attached centrifugal blower, ductwork connecting to the composting process, and outlet port ductwork connecting to the air pollution control device. The actuator is removed to show the shafts, crank arms, and co-planar linkages.

FIG. 2 is an exploded isometric view showing the four rotating vanes and the base plate. The base plate is shown with several stationary vanes, against which the rotating vanes close to provide air-tight seals. In this embodiment of the invention a rotary actuator is shown. The actuator rotates over a range of one quarter turn to change the mode of the aeration. In an alternate embodiment of the invention, a linear actuator would be used and would be co-planar with the crank arms.

FIG. 6 also shows typical control loops that may be used to initiate automatic operation of the damper.

Figure 5:
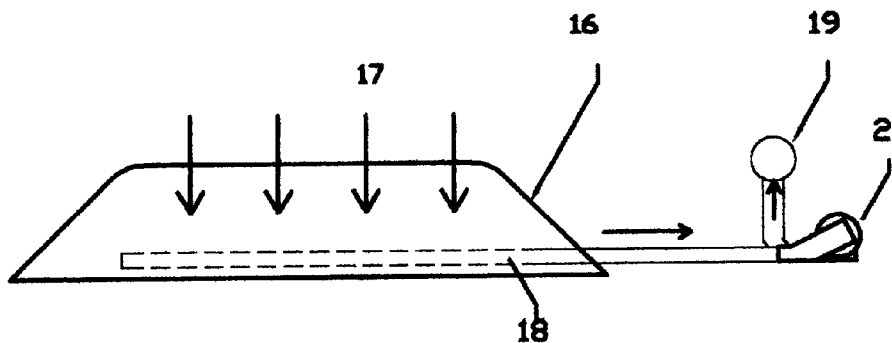
FIG. 5 shows a vertical cross sections of a typical aerated compost pile with air flowing in the negative direction, that is, down through the pile, into the air distribution system and discharged into the exhaust duct.
Figure 6:
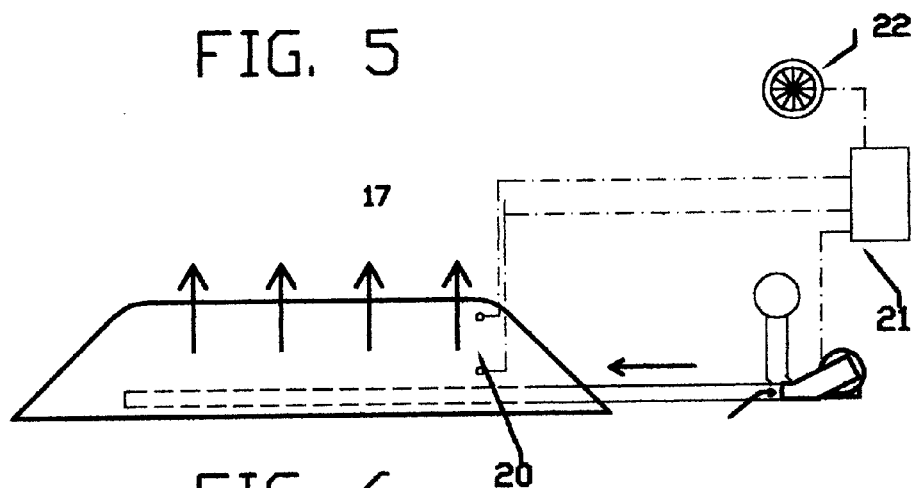
FIG. 6 shows the same cross section with the air movement in the positive direction, that is, fresh air is drawn into the invention and is forced upward through the pile from the air distribution system.
Figure 7:
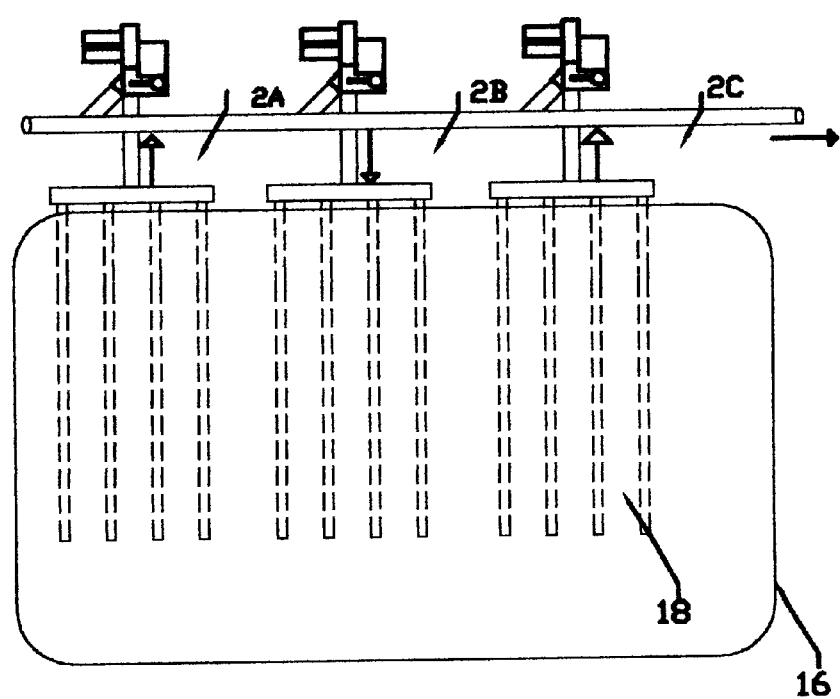
FIG. 7 is a plan view of a typical composting process showing three aeration systems, each with air distribution pipes connected to one unit of the invention. This view shows how the invention allows one section of the pile to be in positive aeration while the adjacent section is in negative aeration.

The compost pile configuration shown in FIGS. 5, 6, and 7 is standard practice and is shown to illustrate one appropriate application of the invention.

DETAILED DESCRIPTION OF THE INVENTION

Figure 1:
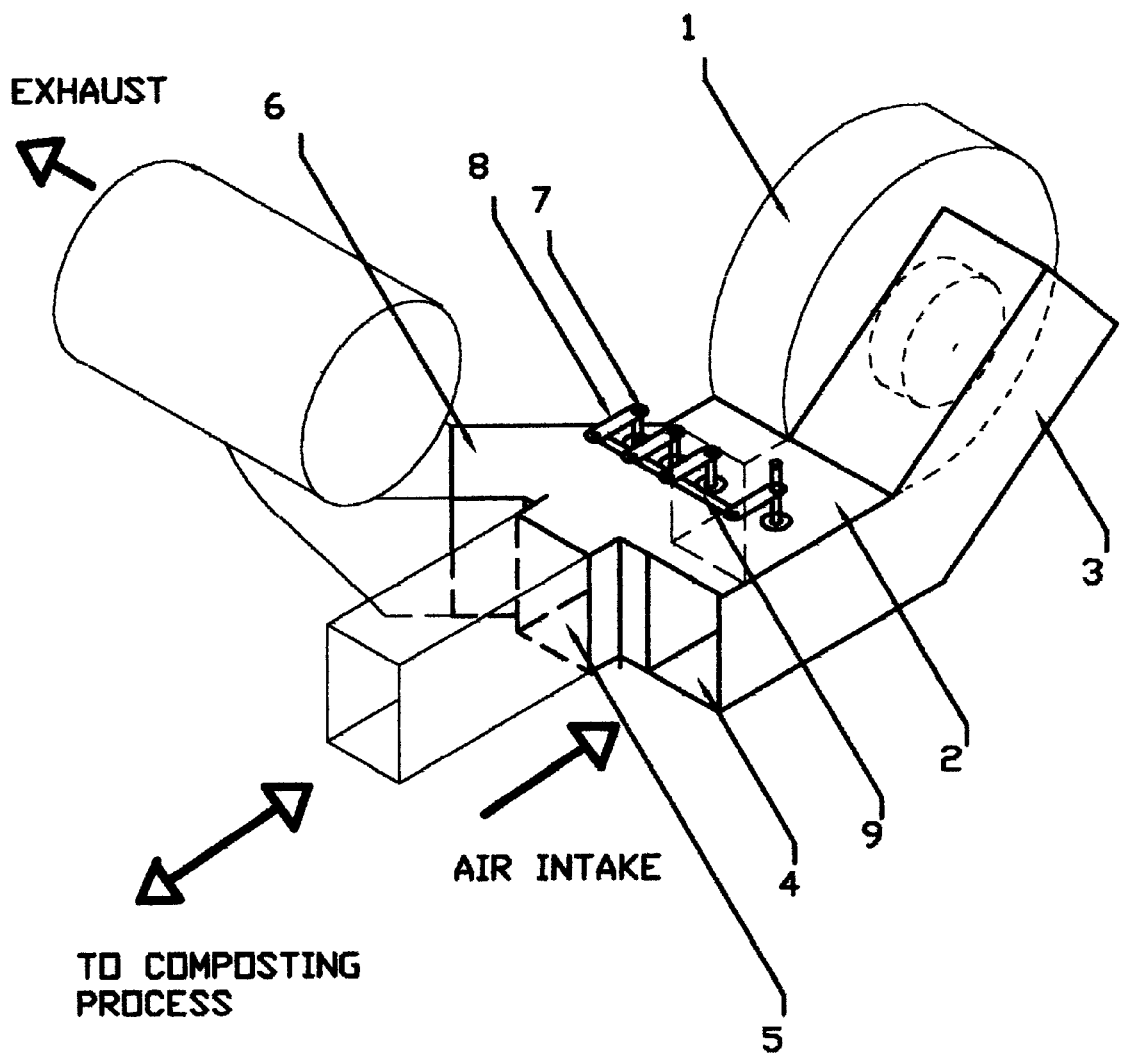

FIG. 1 shows the exterior of the invention attached to a standard centrifugal blower (1). The device may be manufactured as part of the blower or attached to a standard blower. The body of the damper (2) and the duct connecting to the blower inlet (3) may be a single piece, as shown in the figure, or may be separate pieces joined by a flange or seam. The air intake (4) is an opening into which fresh air enters when the damper is set for the positive aeration mode. The center port (5) is connected to the composting process and may either discharge fresh air or draw in exhaust air. The discharge port (6) discharges exhaust air to the air pollution control device when the damper is set in the negative aeration mode. The figure shows the parallel shafts of the damper vanes (7), crank arms (8), and linkage (9), intended to rotate the shafts simultaneously in the same direction. In the preferred embodiment of the invention there is an actuator to rotate the shafts.

The actuator is not shown in FIG. 1. The actuator may be an electric motor with a gear reducer, termed a rotational actuator, a rack and pinion device driven by an electric motor, termed a linear actuator, or a pneumatic or hydraulic piston and cylinder. The specific type of actuator is not claimed as part of the invention and is a standard manufactured component. In an alternative embodiment of the invention the damper may be operated manually.

Figure 2:
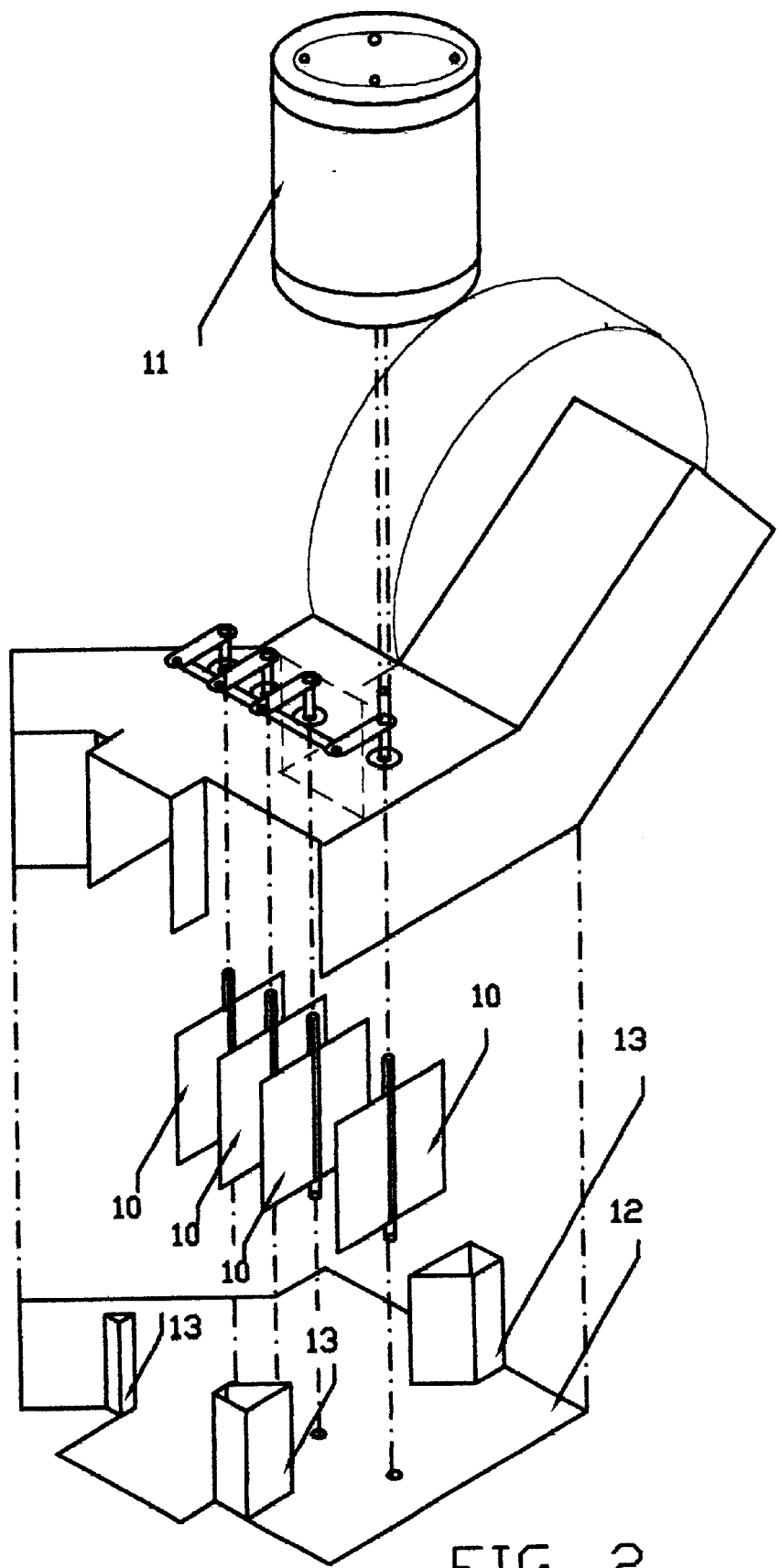

FIG. 2 is an exploded view of the invention, showing the four movable vanes with shafts (10). In large dampers there may be more than four vanes and shafts, to cover wider passages without requiring excessive torque to rotate each shaft. FIG. 2 shows a rotational actuator (11), which would be connected to one shaft and would rotate all of the shafts simultaneously through the crank arms and linkages. In the exploded view, the base plate (12) is shown. Inside the damper are stationary vanes (13) with which the rotating vanes make contact, in order to close off the air passages.

Figure 3:
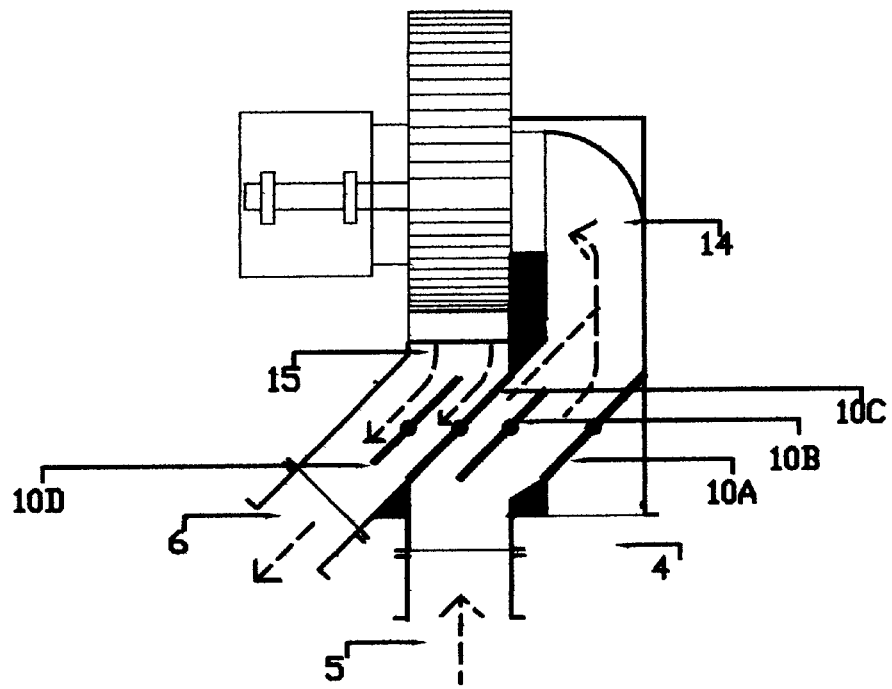
FIG. 3 is a horizontal cross section showing the vanes in the negative aeration mode position. Air from the composting process is drawn into inlet of the blower and discharged through the blower outlet to the air pollution control device.
Figure 4:
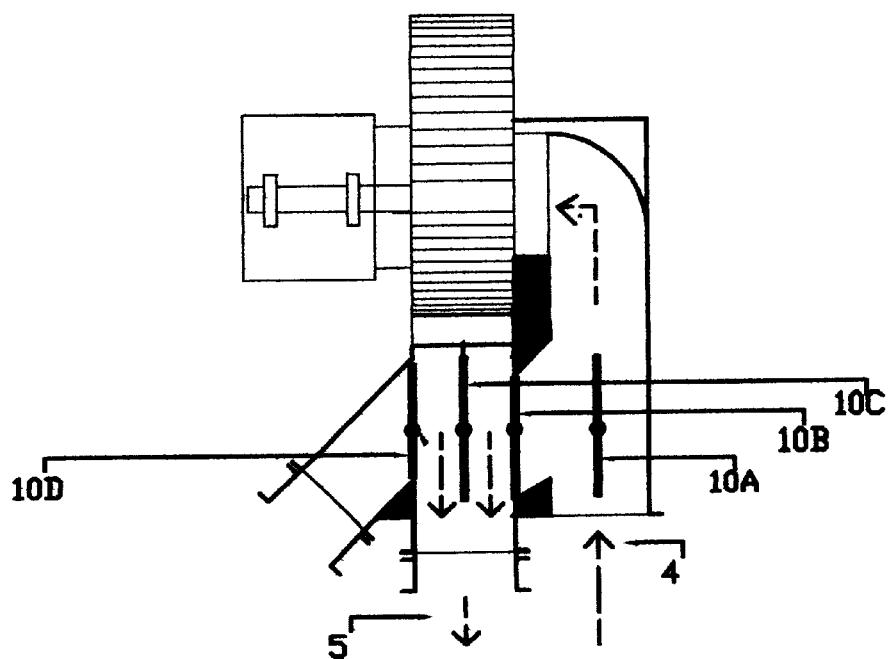
FIG. 4 is a horizontal cross section showing the vanes in the positive aeration mode position. Fresh air is drawn into the inlet of the blower and is discharged through the blower to the composting process.

FIG. 3 is a horizontal cross section through the damper showing the positions of the vanes when the damper is set in the negative aeration mode. The fresh air intake port (4) is blocked by the vane (10A), so that the air entering into the blower must be exhaust drawn from the composting process through the center port (5). Vane (10C) directs the exhaust discharged from the blower outlet (15) to the exhaust port (6), which may be connected to an air pollution control device. Vanes (10B) and (10D) are in the open position. FIG. 4 is a horizontal cross section showing the vanes when the damper is set in the positive aeration mode. Vane (10A) is in the open position, allowing fresh air to enter the blower through the fresh air intake port (4). Vane (10C) is in the open position, allowing fresh air discharged by the blower to enter the composting process through the center port (5) Vanes (10B) and (10D) are in the closed position. All four vanes rotate in the same direction and through the same angle as the damper setting is changed from one aeration mode to the other.

FIG. 5 shows a typical vertical cross section through an aerated compost pile (16) in the negative aeration mode. The arrows (17) represent the direction of air movement, which is downward into the pile. The air is drawn into the air distribution system (18) at the base of the pile. The air distribution system may consist of perforated pipes in a bed of wood chips or a hollow floor in which there are air passages and openings communicating with the compost pile. The specific type of air distribution system is not claimed as part of the invention. The air distribution system is connected to the invention (2). The invention is also connected to the exhaust duct (19) that may be connected to the air pollution control device. The air pollution control device may be a biological filter, absorption scrubber, adsorption media, or thermal device, The specific type of air pollution control device is not claimed as part of this invention.

FIG. 6 shows a vertical cross section through a typical compost pile in the positive aeration mode. The arrows (17) show the exhaust discharged from the surface of the pile. Fresh air is forced into the base of the compost pile through the air distribution system. In the positive aeration mode, no exhaust is discharged to the air pollution control device. FIG. 6 also shows typical control loops that may be used to initiate the change of damper position automatically. Temperature sensors (20) measure the temperature difference between the core and the top of the pile. They are connected to a controller (21) that powers the actuator. Excessively high temperature at the core of the pile would initiate positive aeration. Low temperatures at the core would initiate negative aeration. Alternatively, a timer (22) can initiate a change of damper position.

FIG. 7 is a horizontal cross section or plan view of a typical air distribution system for a continuous aerated compost pile, with an outline of the pile (16). There are three separate independently operated blowers each connected to a separate array of air distribution pipes (18). In FIG. 7 each of the blowers is equipped with the invention. Blowers (2A) and (2C) are shown in the negative aeration mode,as indicated by the arrows, and the exhaust is discharged to the common duct connected to the air pollution control device (19). Blower (2B) is shown in the positive aeration mode, as indicated by the arrow. The figure illustrates how the invention allows various sections of the continuous pile to be operated in differing aeration modes.

CONCLUSION

The present invention is a self contained damper for reversing the flow of air to a process with the rotation if a single shaft, thereby allowing the automation of the process with a single actuator motor.

Although the present invention has been described for use in the composting process it may be applied to any aeration process in which reversal of air flow is necessary or preferred, such as drying processes and regenerative thermal air pollution control devices.

The invention may be manufactured as an integral part of a blower, or as a separate component to be attached to a standard blower. The invention may be manufactured as a box damper with separate ductwork components connecting it to the blower intake and to the center and exhaust ports, or it may be manufactured as a single unit including all connecting ductwork as shown in FIGS. 1 and 2.

What is claimed is:

1. A method of directing the flow of pressurized air in an air distribution system comprising the steps of:

providing a blower having both an air inlet and an air outlet, said blower producing a flow of air;

providing a damper housing;

providing a central port defined in said damper housing;

connecting said air outlet of said blower to said air distribution system through said central port in a first mode of operation;

providing an inlet port defined in said damper housing;

connecting said inlet port to said air inlet of said blower in said first mode of operation;

providing an exhaust port defined in said damper housing;

providing first, second, third and fourth rotatable vanes disposed substantially parallel to one another in said damper housing and in said first mode of operation said first vane blocking said exhaust port, said second vane disposed within said central port allowing air flow therethrough from said blower outlet, said third vane blocking said inlet port from said central port, and said fourth vane disposed within said inlet port allowing air flow therethrough; and rotating said first, second, third and fourth vanes to a second mode of operation wherein said first vane is disposed within said exhaust port allowing air flow therethrough, said second vane blocks said central port directing the flow of air from said air outlet of said blower out said exhaust port, said fourth vane blocking said inlet port and aligning said central port with said air inlet of said blower such that said central port draws air from said air distribution system causing the air circulation within said central port to be reversed from the air flow direction of said first mode of operation.

2. The method of claim 1 further including the steps of:

linking said first, second, third and fourth vanes together; and actuating the movement of said first, second, third and fourth vanes by a common actuator.

3. The method of claim 2 further including the steps of:

providing first, second, third and fourth shafts, said shafts disposed in parallel alignment with one another, each of said shafts having a crank arm;

mounting said first, second, third and fourth vanes, respectively, on said first, second, third and fourth shafts; and linking said crank arms by a common member such that movement of said common member moves said first, second, third and fourth shafts.

4. The method of claim 3 further including the step of:

providing said damper housing as an integral part of said blower.

5. The method of claim 3 further including the steps of:

providing said damper housing independent of said blower; and attaching said damper housing to said blower.

6. A damper for the reversal from a first outward direction of air flow to a second reverse direction of air flow from a blower having an inlet and an outlet, comprising:

a housing having defined therein an exhaust port, a central port and an inlet port, said central port, when air flow from said blower is in a first outward direction in a first mode receiving air from said outlet of said blower;

said inlet port, when said air flow from said outlet of said blower is in a first outward direction through said central port, directing air into said inlet of said blower;

said damper when operated in said second reverse direction in a second mode including means to block said inlet port, means to block said central port from said blower outlet and direct the air flow through said central port to said blower inlet and means to open said exhaust port to receive the air flow from said blower outlet such that the air flow through said central port is reversed from the air direction in said first mode.

7. The damper of claim 6 wherein said means to block said inlet port, said means to block said central port and direct its air flow to said blower outlet and said means to open said exhaust port to receive air from said blower outlet comprise:

four rotatable vanes disposed in said housing to direct air flow in an outward direction in said first mode through said central port and to reverse the direction of air flow in said central port in said second mode.

8. A damper for reversing the flow of air from a blower having an air inlet and air outlet, comprising:

a housing having a central port communicating with said air outlet of said blower;

an inlet port communicating with said air inlet of said blower;

an exhaust port;

passages defined between said inlet port, central port and exhaust port, said inlet port, central port and exhaust ports in communication with one another through said passages; and first, second, third and fourth vanes rotatably engaged within said ports and in a first mode of operation said first vane blocking the passage between said exhaust port from said central port, said third vane blocking the passage between said inlet port from said central port, and in a second mode wherein said first, second, third and fourth vanes have been rotated with said second vane blocking said central port and directing the air flow of said blower out said exhaust port and connecting said central port to said inlet port, and said fourth vane blocking said exhaust port such that in said first mode of operation said blower receives air through said inlet port and blows air out said central port, and in said second mode of operation said blower receives air through said central port and blows air out said exhaust port.

9. The damper of claim 8 further including actuation means to rotate said first, second, third and fourth vanes.

10. The damper of claim 9 wherein said first, second, third and fourth vanes are linked to one another.

11. The damper of claim 10 further including:

first, second, third and fourth shafts disposed in parallel alignment with one another, said first, second, third and fourth vanes mounted, respectively, on said first, second, third and fourth shafts in said housing;

first, second, third and fourth crank arms disposed, respectively, on said first, second, third and fourth shafts; and a linkage member attached to said first, second, third and fourth crank arms such that movement of said linkage member by said actuation means rotates said first, second, third and fourth shafts and their respective first, second, third and fourth vanes through a similar angular displacement.

12. A composting aeration device comprising:

a blower producing a flow of air, said blower having an air inlet and an air outlet;

an air distribution system extending through material to be composted;

a damper for reversing the flow of air from said blower to and from said air distribution system, said damper having a housing;

said housing having a central port communicating with said air outlet of said blower;

said housing having an inlet port communicating with said air inlet of said blower;

said housing having an exhaust port;

said housing having passages defined between said inlet port, central port and exhaust port, said exhaust, inlet and central ports in communication with one another through said passages; and first, second, third and fourth vanes rotatably engaged within said exhaust, inlet and central ports wherein in a first mode of operation said first vane blocks the passage between said exhaust port from said central port, said third vane blocks the passage between said intake port from said central port, and wherein in a second mode of operation said first, second, third and fourth vanes have been rotated with said second vane blocking said central port and directing the air flow of said blower out said exhaust port and connecting said central port to said inlet port, and said fourth vane blocking said exhaust port such that in said first mode of operation said blower receives air through said inlet port and blows air out said central port, and in said second mode of operation said blower receives air through said central port and blows air out said exhaust port.

13. The composting aeration device of claim 12 wherein said first, second, third and fourth vanes are linked together; and wherein a common actuator actuates the movement of said first, second, third and fourth vanes.

14. The composting aeration device of claim 13 further including:

first, second, third and fourth shafts, said shafts disposed in parallel alignment with one another, each of said shafts having a crank arm;

wherein said first, second, third and fourth vanes are mounted, respectively, on said first, second, third and fourth shafts; and wherein said crank arms are linked by a common member such that movement of said common member moves said first, second, third and fourth shafts.

15. The composting aeration device of claim 14 wherein said damper housing is an integral part of said blower.

16. The composting aeration device of claim 15 wherein said damper housing is independent of said blower and wherein said damper housing is attached to said blower.

17. The composting aeration device of claim 14 further including means to sense compost conditions and to direct said aeration device to be in a first or second mode of operation based on said compost conditions.

* * * * *